United States Patent
Shen et al.

(10) Patent No.: US 11,557,780 B2
(45) Date of Patent: Jan. 17, 2023

(54) FUEL CELL ENERGY SUPPLY SYSTEM AND ENERGY REGULATION METHOD BASED ON SAME

(71) Applicant: Delta Electronics (Shanghai) Co., Ltd., Shanghai (CN)

(72) Inventors: Guoqiao Shen, Shanghai (CN); Tsu-Hua Ai, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/233,568

(22) Filed: Apr. 19, 2021

(65) Prior Publication Data
US 2021/0328240 A1    Oct. 21, 2021

(30) Foreign Application Priority Data
Apr. 20, 2020 (CN) .......................... 202010310178.1

(51) Int. Cl.
H01M 8/04       (2016.01)
H01M 8/04858    (2016.01)

(52) U.S. Cl.
CPC ....... *H01M 8/0494* (2013.01); *H01M 8/0488* (2013.01); *H01M 8/0491* (2013.01)

(58) Field of Classification Search
CPC . H01M 8/0494; H01M 8/0488; H01M 8/0491
See application file for complete search history.

(56) References Cited

U.S. PATENT DOCUMENTS

| 9,735,615 B2 | 8/2017 | Colombi et al. |
| 10,965,126 B2 | 3/2021 | Zhu et al. |

(Continued)

FOREIGN PATENT DOCUMENTS

| CN | 109378875 A | 2/2019 |
| CN | 109861261 A | 6/2019 |

(Continued)

OTHER PUBLICATIONS

S. Sharma et al., "A Modified Droop Control Algorithm for DC Microgrids to Achieve Accurate Current Sharing and Improved Voltage Regulation," 2021 IEEE Applied Power Electronics Conference and Exposition (APEC), 2021, pp. 119-125.

(Continued)

*Primary Examiner* — Olatunji A Godo
(74) *Attorney, Agent, or Firm* — CKC & Partners Co., LLC

(57) ABSTRACT

An energy regulation method for a fuel cell energy supply system including a plurality of fuel cell power generation modules, a plurality of power conversion modules, and a communication control module connected to the plurality of power conversion modules includes: calculating a parameter average value based on an energy state parameter of the fuel cell power generation module; calculating a compensation factor depending on the energy state parameter and the parameter average value; calculating a control parameter reference value of each of the power conversion modules based on a droop algorithm, and multiplying the control parameter reference value by the corresponding compensation factor to obtain a control parameter set value of the power conversion module; and regulating the corresponding fuel cell power generation modules depending on the control parameter set value.

13 Claims, 2 Drawing Sheets

(56) References Cited

U.S. PATENT DOCUMENTS

| 11,128,141 B2 | 9/2021 | Marchegiani et al. |
| 2011/0187197 A1* | 8/2011 | Moth ..................... H02J 9/062 307/66 |

FOREIGN PATENT DOCUMENTS

| JP | 2014026862 A | 2/2014 |
| JP | 2020022331 A | 2/2020 |
| JP | WO2019103059 A1 | 11/2020 |

OTHER PUBLICATIONS

X. Xiaofei et al., "Research on new algorithm of droop control," 2018 Chinese Control and Decision Conference (CCDC), 2018, pp. 4166-4170.

Li Wenwen, Tong Xiaoyang, "Improved Dynamic Droop Control Algorithm Based on DC Micro-grid Power Fluctuation and Available Power of Super Capacitor", Electrotechnical Technology, 2021(10), pp. 69-73.

* cited by examiner

FUEL CELL ENERGY SUPPLY SYSTEM AND ENERGY REGULATION METHOD BASED ON SAME

CROSS-REFERENCE TO RELATED APPLICATIONS

This non-provisional application claims priority under 35 U.S.C. § 119(a) on Patent Application No. 202010310178.1 filed in P.R. China on Apr. 20, 2020, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD

The invention relates to a fuel cell energy supply system and an energy regulation method based on same.

BACKGROUND

The fuel cell energy supply system is the important direction of future energy development due to its advantages of high efficiency, large power density, modularization and long life. For example, conventional SOFCs (Solid Oxide Fuel Cells) can achieve comprehensive efficiency in a range of 80% to 90%.

However, the current fuel cells have the problems such as low output voltage, large fluctuation of the DC voltage, and poor adaptability to the low-frequency ripple, so it requires a DC/DC converter for front-end boost and voltage regulation control. However, during operation of the large power fuel cell energy supply system, the DC/DC converter mainly controls a DC bus voltage, and is poor in current control and regulation of the fuel cells.

On one hand, in order to allow respective fuel cell module in the fuel cell energy supply system to evenly share the output power, generally the DC/DC converter utilizes centralized communication, droop control, and the like. However, the centralized communication has disadvantages such as slow response speed and low reliability, while in droop control, accuracy of the bus voltage and balance degree of current among respective fuel cell modules generally need to be compromised. In order to have a higher accuracy of the bus voltage, there is still imbalance of current among respective fuel cell modules.

On the other hand, due to factors such as manufacturing processes, service life and health conditions, there are also difference of power generation efficiencies, difference of output voltages, and difference of electric stack temperatures among multiple fuel cell modules, and it is necessary to effectively utilize characteristic parameters of the fuel cells to optimize operation of the fuel cell energy supply system.

Therefore, it becomes an important technical problem to optimize distribution of output power of multiple fuel cells while controlling the bus voltage/output current.

SUMMARY

An object of the embodiments of the present invention is to provide a fuel cell energy supply system and an energy regulation method thereof, which can achieve energy/power optimized regulation based on operation conditions of respective fuel cells.

According to an aspect of an embodiment to realize the above object, an energy regulation method for a fuel cell energy supply system is provided, wherein the fuel cell energy supply system includes a plurality of fuel cell power generation modules, a plurality of power conversion modules and a communication control module, the communication control module is connected to the plurality of power conversion modules, and the plurality of fuel cell power generation modules are electrically connected to a DC bus via corresponding power conversion modules, the method including:

calculating, by the communication control module, a corresponding parameter average value based on at least one energy state parameter of each of the fuel cell power generation modules;

calculating, by the communication control module, a corresponding compensation factor depending on the energy state parameter and the parameter average value of each of the fuel cell power generation modules, and sending the compensation factor to the corresponding power conversion modules; or calculating, by the power conversion modules, the corresponding compensation factor depending on the energy state parameter of the correspondingly connected fuel cell power generation module and the parameter average value sent by the communication control module;

calculating, by the power conversion modules a control parameter reference value of each of the power conversion modules using a droop algorithm, and multiplying the control parameter reference value by the corresponding compensation factor to obtain a control parameter set value of the power conversion module; and regulating, by the power conversion modules, the corresponding fuel cell power generation modules depending on the control parameter set value.

In one embodiment of the invention, the energy state parameter is at least one of an output voltage value, a system set value of output voltage, a set value of output current, a temperature detection value, a power detection value, and calculated value of conversion efficiency of the fuel cell power generation module, a detection value of fuel supply flow or pressure of the fuel cell power generation module, and a health level detection value of the fuel cell power generation module.

In one embodiment of the invention, the compensation factor is a quotient of the energy state parameter of each of the fuel cell power generation modules and an average value of the energy state parameters of the plurality of fuel cell power generation modules.

In one embodiment of the invention, the communication control module is in wired or wireless communication with the plurality of power conversion modules.

In one embodiment of the invention, the power conversion modules are DC/DC conversion modules.

In one embodiment of the invention, prior to multiplying the control parameter reference value of each of the power conversion modules by the corresponding compensation factor, further includes:

limiting, by the communication control module or the power conversion module, range of the compensation factor.

To realize the above object, one embodiment of the invention further provides a fuel cell energy supply system, including:

a plurality of fuel cell power generation modules;

a plurality of power conversion modules electrically connecting the corresponding fuel cell power generation modules to a DC bus; and a communication control module connected to the plurality of power conversion modules;

wherein the communication control module calculates a corresponding parameter average value based on at least one energy state parameter of each of the fuel cell power generation modules;

the communication control module calculates a corresponding compensation factor depending on the energy state parameter and the parameter average value of each of the fuel cell power generation modules, and sends the calculated corresponding compensation factor to the corresponding power conversion modules; or the power conversion modules calculate the corresponding compensation factor depending on the energy state parameter of the correspondingly connected fuel cell power generation modules and the parameter average value sent by the communication control module;

the power conversion modules calculate a control parameter reference value of each of the power conversion modules using a droop algorithm, and multiply the control parameter reference value by the corresponding compensation factor to obtain a control parameter set value of the power conversion module; and the power conversion modules regulate the corresponding fuel cell power generation modules depending on the control parameter set value.

In another embodiment of the invention, the energy state parameter is at least one of an output voltage value, a system set value of output voltage, a set value of output current, a temperature detection value, a power detection value, and a conversion efficiency calculated value of the fuel cell power generation module, a detection value of fuel supply flow or pressure of the fuel cell power generation module, and a health level detection value of the fuel cell power generation module.

In one embodiment of the invention, the compensation factor is a quotient of the energy state parameter of each of the fuel cell power generation modules and an average value of the energy state parameters of the plurality of fuel cell power generation modules.

In one embodiment of the invention, the communication control module is in wired or wireless communication with the plurality of power conversion modules.

In one embodiment of the invention, the power conversion modules are DC/DC conversion modules.

In one embodiment of the invention, prior to multiplying the control parameter reference value of each of the power conversion modules by the corresponding compensation factor, the communication control module or the power conversion module limits range of the compensation factor.

In one embodiment of the invention, the DC bus is further connected to a power grid through a DC/AC conversion module.

The embodiments of the present invention achieve energy/power optimized control of the fuel cell energy supply system by incorporating a compensation factor associated with the energy state parameter of the fuel cells. The invention has an advantage of achieving energy/power optimized control based on the energy state of respective fuel cell power generation modules by using the compensation factor, while meeting the substantive balance between power control of the DC bus and output power of respective fuel cell power generation modules.

The additional aspects and advantages of the invention are partially explained in the below description, and partially becoming apparent from the description, or can be obtained through practice of the invention.

BRIEF DESCRIPTION OF THE DRAWINGS

The exemplary embodiments are described in detail with reference to the accompanying drawings, through which the above and other features and advantages of the invention will become more apparent.

DETAILED DESCRIPTION

Figure 1:
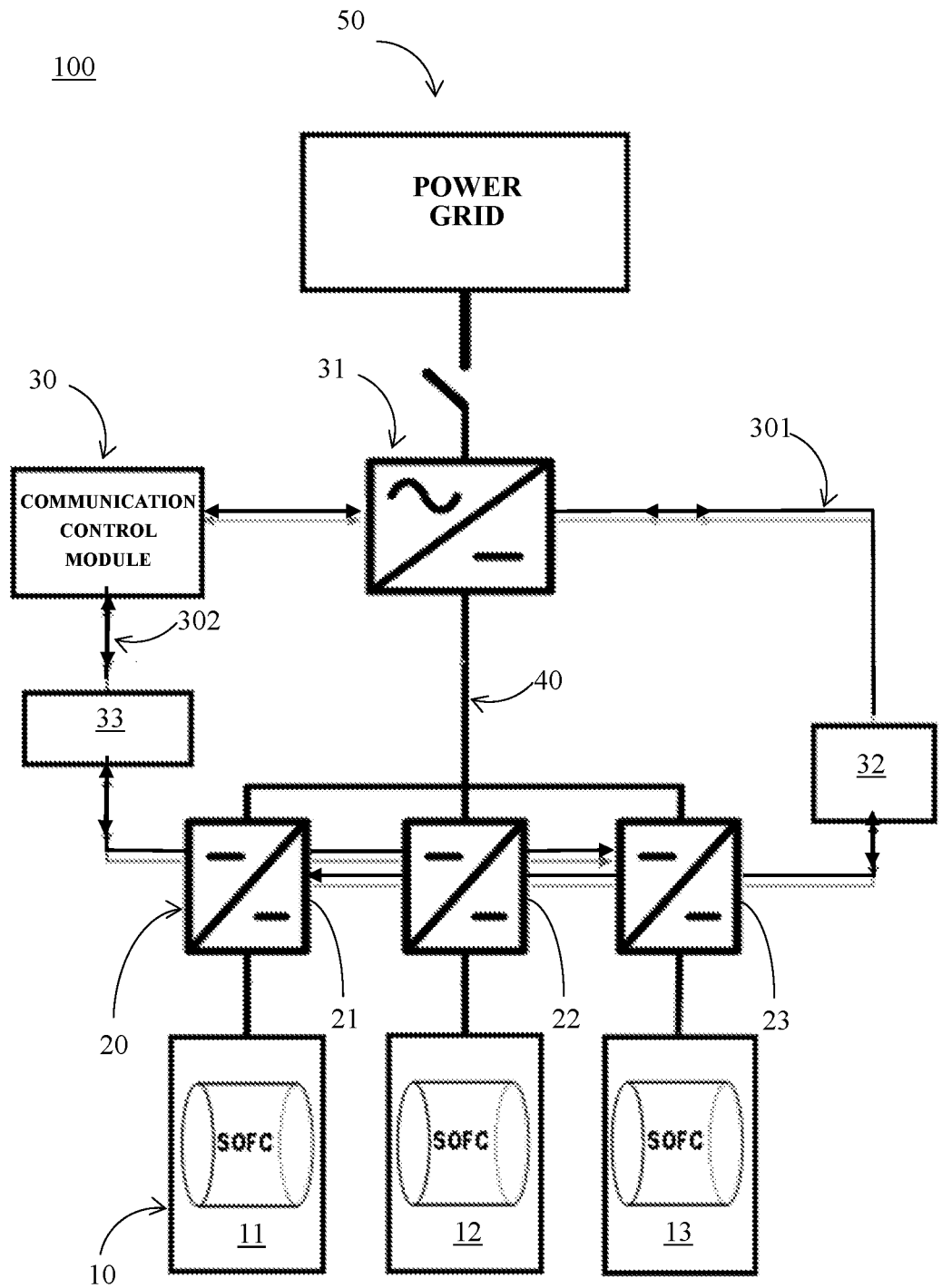
FIG. 1 is a structural diagram of a fuel cell energy supply system according to one embodiment of the present invention.

The exemplary embodiments will now be described more fully with reference to the accompanying drawings. However, the exemplary embodiments can be implemented in various forms and should not be understood as being limited to the embodiments set forth herein; on the contrary, these embodiments are provided so that this invention will be thorough and complete, and the conception of exemplary embodiments will be fully given to those skilled in the art. In the drawings, the same reference numeral indicates the same or similar structure, so their detailed description will be omitted.

When factors/components/the like described and/or illustrated herein are introduced, the terms "one", "a(an)", "the", "said" and "at least one" refer to one or more factors/components/the like. The terms "include", "comprise" and "have" refer to an open-ended inclusion, and refer to that there may be additional factors/components/the like in addition to the listed factors/components/the like. The embodiments may use relative terms, such as, "upper" or "lower" to describe a relative relation of one signed component over another component. It should be understood that if the signed device reverses to turn upside down, the described component on an "upper" side will become a component on a "lower" side. In addition, the terms "first", "second" and the like in the claims are only used as signs, instead of numeral limitations to objects.

As shown in FIG. 1, a fuel cell energy supply system 100 of one embodiment of the invention includes a plurality of fuel cell power generation modules 10, a plurality of power conversion modules 20, and a communication control module. The plurality of power conversion modules 20 electrically connects the corresponding fuel cell power generation modules 10 to a DC bus 40. For example, FIG. 1 illustrates three fuel cell power generation modules 11, 12, and 13 electrically connected to the corresponding power conversion modules 21, 22, and 23, respectively, and the power conversion modules 21 to 23 are electrically connected to the DC bus 40. The communication control module 30 is connected to the plurality of power conversion modules 20. For example, the communication control module 30 may be in wired or wireless communication with the plurality of power conversion modules 20. Preferably, the fuel cell power generation modules 10, such as, may include SOFCs (Solid Oxide Fuel Cells). These power conversion modules 21 to 23, for example, may include DC/DC conversion modules, and may be further connected to a power grid 50 via the DC bus 40 through a DC/AC conversion module 31.

Figure 2:
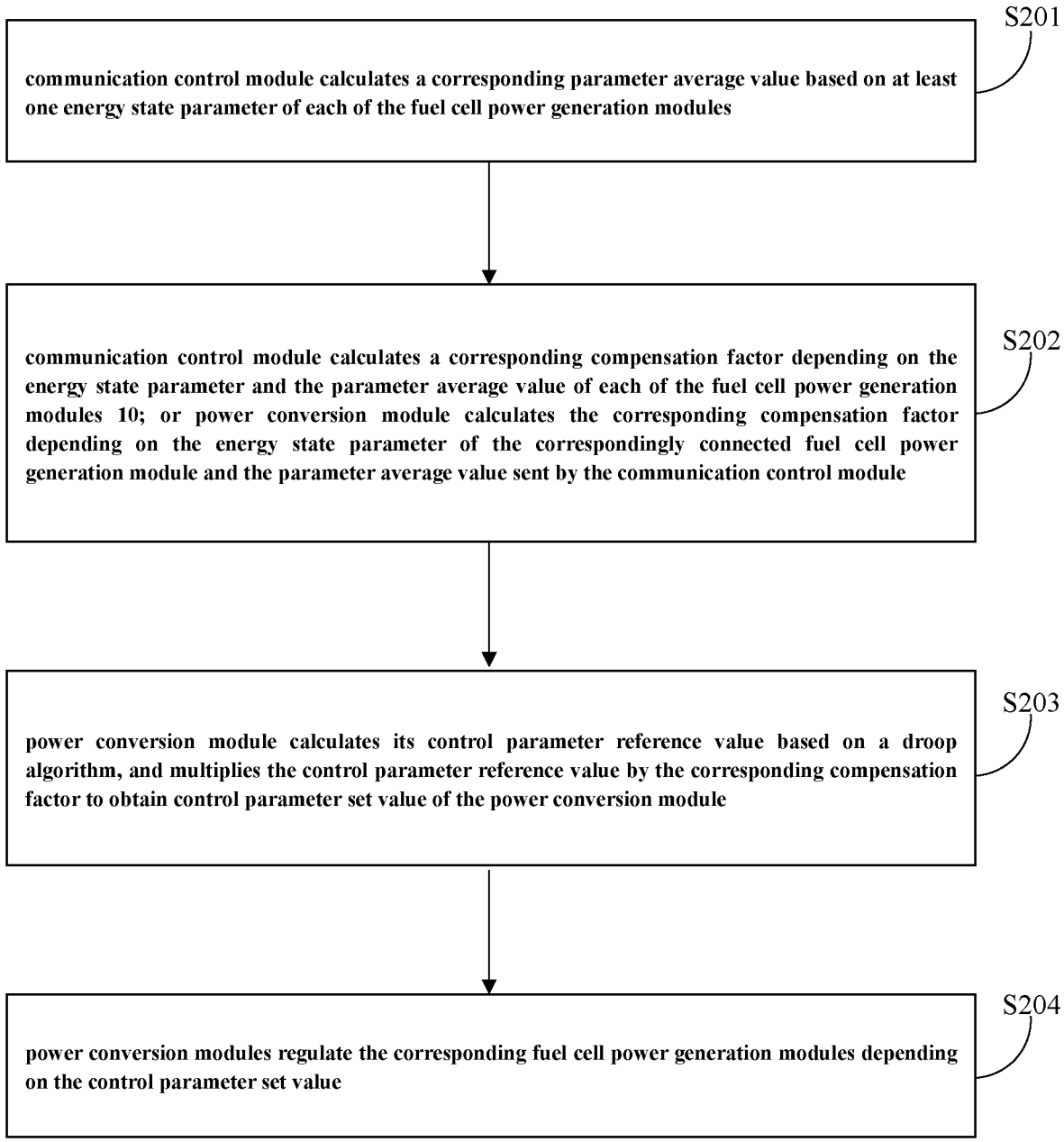
FIG. 2 is a flow diagram of an energy regulation method based on the fuel cell energy supply system according to one embodiment of the present invention.

Combining with FIG. 1, as shown in FIG. 2, an energy regulation method of the fuel cell energy supply system of one embodiment of the present invention includes following steps.

In step S201, the communication control module 30 calculates a corresponding parameter average value based on at least one energy state parameter of each of the fuel cell power generation modules 10. In the embodiment, the parameter average value based on at least one energy state parameter of each of the fuel cell power generation modules 10 is provided by the communication control module 30.

In step S202, the communication control module 30 calculates a corresponding compensation factor depending on the energy state parameter and the parameter average value of each of the fuel cell power generation modules 10 and sends the calculated corresponding compensation factor to the corresponding power conversion modules 20; or the power conversion module 20 calculates the corresponding compensation factor depending on the energy state parameter of the correspondingly connected fuel cell power generation module 10 and the parameter average value sent by the communication control module 30. In one embodiment, in step S202, at least one of the power conversion modules 21, 22, 23 calculates the corresponding compensation factor depending on the energy state parameter of at least one of the correspondingly connected fuel cell power generation modules 11, 12, 13 and the parameter average value sent by the communication control module 30. In one embodiment, in step S202, the power conversion module 20 calculates the corresponding compensation factor depending on the energy state parameter of the correspondingly connected fuel cell power generation module 10 and the parameter average value sent by the communication control module 30. In one embodiment, in step S202, the plurality of power conversion modules 21, 22, 23 calculate the corresponding compensation factors depending on the energy state parameters of the correspondingly connected fuel cell power generation modules 11, 12, 13 and the parameter average value sent by the communication control module 30, respectively.

In step S203, the power conversion module 20 calculates its control parameter reference value based on a droop algorithm, and multiplies the control parameter reference value by the corresponding compensation factor to obtain its control parameter set value. In one embodiment, in step S203, at least one of the power conversion modules 20 calculates its control parameter reference value based on the droop algorithm, and multiplies the control parameter reference value by the corresponding compensation factor to obtain its control parameter set value. In one embodiment, in step S203, a calculation of the control parameter reference value of the power conversion module 20 may be performed by the corresponding the power conversion module 20 or at least parts of the plurality of power conversion modules 20. In one embodiment, in step S203, each of the power conversion modules 21, 22, 23 calculates its control parameter reference value based on the droop algorithm and multiplies the control parameter reference value by the corresponding compensation factor to obtain its corresponding control parameter set value, respectively.

In step S204, the power conversion modules 20 regulate the corresponding fuel cell power generation modules 10 depending on the control parameter set value. In one embodiment, in step S204, the fuel cell power generation modules 11, 12, 13 are regulated by the corresponding power conversion modules 21, 22, 23 depending on the control parameter set value, respectively.

In the present disclosure, the energy state parameter includes but not limited to at least one of an output voltage value, a system set value of output voltage, a set value of output current, a temperature detection value, a power detection value, and a conversion efficiency calculated value of the fuel cell power generation module, a fuel supply flow or a pressure detection value of the fuel cell power generation module, and a health level detection value of the fuel cell power generation module, i.e., the energy state parameter includes one or more factors associated with normal operation or optimization of the fuel cells. The compensation factor may be a quotient of the energy state parameter of each of the fuel cell power generation modules 10 and an average value of the energy state parameters of the plurality of fuel cell power generation modules 10.

Moreover, in the embodiment shown in FIG. 1, the DC/AC conversion module 31, for example, may be integrated into a Power Conversion System (PCS), or arranged separately. The communication control module 30 may be arranged separately, and also may be integrated into the PCS. In other embodiment, the communication control module 30 also may be in communicational connection with the plurality of power conversion modules 20 through a first communication channel 301 and a second communication channel 302, respectively, and may be provided with corresponding signal transceiver modules 32 and 33 in the first communication channel 301 and the second communication channel 302 for receiving and sending signals. Of course, it should be understood that in other embodiment, the communication control module 30 also may be in direct communicational connection with the plurality of power conversion modules 20 through one communication channel, but the invention is not limited thereto.

More preferably, in the embodiment of the present invention, prior to multiplying the control parameter reference value of each of the power conversion modules by the corresponding compensation factor, the communication control module or the power conversion module regulates an range limitation of the compensation factor.

The embodiment of the present invention incorporates a compensation factor associated with respective energy state parameters of the fuel cell power generation modules in control of bus voltage, output current or power, so that each of the power conversion modules connected in parallel, on the basis of the original power balance control, performs fine regulation on input or output voltage/current/power of the power conversion modules depending on state of the correspondingly connected fuel cell power generation modules.

Hereinafter the energy regulation method of one embodiment of the present invention and its advantages are described in detail in two specific examples.

Specific Example 1

Balance of Output Voltages

The communication control module 30 monitors output voltages of respective fuel cell power generation modules, and uses a quotient dividing the output voltages of respective fuel cell power generation modules by an average value of the output voltages as a compensation factor of respective fuel cell power generation modules. The DC bus 40 is connected to the plurality of power conversion modules 20 of the plurality of fuel cell power generation modules 10. The communication control module 30 calculates an output current or power reference value on the basis of droop algorithm—output current or power reference value is decreased when the dc bus voltage rises, and multiplies the calculated value by the compensation factor to obtain an output current or power set value. The power conversion modules 20 regulate the output current or power of the corresponding fuel cell power generation modules 10 depending on the output current or power set value. In such way, the fuel cell power generation modules 10 with relatively higher output voltages output a larger current, and based on output characteristics of the fuel cells, the output voltages of respective fuel cell power generation modules 10 may be closer to the average value of the output voltages.

Specific Example 2

Efficiency Optimization of Respective Fuel Cell Power Generation Modules

The communication control module 30 monitors electric stack efficiencies of respective fuel cell power generation modules, and uses a quotient dividing the electric stack efficiencies of respective fuel cell power generation modules by an average value of the electric stack efficiencies as a compensation factor of respective fuel cell power generation modules. The DC bus 40 is connected to the plurality of power conversion modules 20 of the plurality of fuel cell power generation modules 10. The communication control module 30 calculates an output current or power reference value on the basis of droop control method, and multiplies the calculated value by the compensation factor to obtain an output current or power set value. The power conversion modules 20 regulate the output current or power of the corresponding fuel cell power generation modules 10 depending on the output current or power set value. Prior to multiplying the output current or power reference value, an range limitation of the compensation factor may be regulated by at least one of the communication control module 30 and the power conversion module 20. In such way, the fuel cell power generation modules 10 with relatively higher electric stack efficiencies output a larger power.

Accordingly, the embodiment of the present invention achieves energy/power optimized control of the fuel cell energy supply system by incorporating a compensation factor associated with the energy state parameter of the fuel cells. The invention has an advantage of achieving energy/power optimized control based on the energy state of respective fuel cell power generation modules through the compensation factor, while meeting the substantive balance between power control of the DC bus and output power of respective fuel cell power generation modules.

Exemplary embodiments of the invention have been shown and described above. It should be understood that the invention is not limited to the disclosed embodiments. Instead, the invention intends to cover various modifications and equivalent settings included in the spirit and scope of the appended claims.

What is claimed is:

1. An energy regulation method for a fuel cell energy supply system comprising a plurality of fuel cell power generation modules, a plurality of power conversion modules, and a communication control module, wherein the communication control module is connected to the plurality of power conversion modules, and the plurality of fuel cell power generation modules are electrically connected to a DC bus via the corresponding power conversion modules, the method comprising:
    calculating, by the communication control module, a corresponding parameter average value based on at least one energy state parameter of each of the fuel cell power generation modules;
    calculating, by the communication control module, a corresponding compensation factor depending on the energy state parameter and the parameter average value of each of the fuel cell power generation modules, and sending the corresponding compensation factor to the corresponding power conversion module; or calculating, by the power conversion module, the corresponding compensation factor depending on the energy state parameter of the correspondingly connected fuel cell power generation module and the parameter average value sent by the communication control module;
    calculating, by the power conversion modules, a control parameter reference value of each of the power conversion modules using a droop algorithm, and multiplying the control parameter reference value by the corresponding compensation factor to obtain a control parameter set value of the power conversion module; and
    regulating, by the power conversion modules, the corresponding fuel cell power generation modules depending on the control parameter set value.

2. The energy regulation method for a fuel cell energy supply system according to claim 1, wherein the energy state parameter comprises at least one of an output voltage value, a system set value of output voltage, a set value of output current, a temperature detection value, a power detection value, and a conversion efficiency calculated value of the fuel cell power generation module, a detection value of fuel supply flow or pressure of the fuel cell power generation module, and a health level detection value of the fuel cell power generation module.

3. The energy regulation method for a fuel cell energy supply system according to claim 1, wherein the compensation factor is a quotient of the energy state parameter of each of the fuel cell power generation modules and an average value of the energy state parameters of the plurality of fuel cell power generation modules.

4. The energy regulation method for a fuel cell energy supply system according to claim 1, wherein the communication control module is in wired or wireless communication with the plurality of power conversion modules.

5. The energy regulation method for a fuel cell energy supply system according to claim 1, wherein the power conversion modules comprise DC/DC conversion modules.

6. The energy regulation method for a fuel cell energy supply system according to claim 1, prior to multiplying the control parameter reference value of each of the power conversion modules by the corresponding compensation factor, further comprising:
    limiting, by at least one of the communication control modules and the power conversion module, range of the compensation factor.

7. A fuel cell energy supply system, comprising:
    a plurality of fuel cell power generation modules;
    a plurality of power conversion modules electrically connecting the corresponding fuel cell power generation modules to a DC bus; and
    a communication control module connected to the plurality of power conversion modules;
    wherein the communication control module is adapted to calculate a corresponding parameter average value based on at least one energy state parameter of each of the fuel cell power generation modules;
    the communication control module is adapted to calculate a corresponding compensation factor depending on the energy state parameter and the parameter average value of each of the fuel cell power generation modules, and send the corresponding compensation factor to the corresponding power conversion module; or the power conversion module is adapted to calculate the corresponding compensation factor depending on the energy state parameter of the correspondingly connected fuel cell power generation module and the parameter average value sent by the communication control module;

the power conversion module is adapted to calculate a control parameter reference value of the power conversion module based on a droop algorithm, and multiply the control parameter reference value by the corresponding compensation factor to obtain a control parameter set value of the power conversion module; and the power conversion module is adapted to regulate the corresponding fuel cell power generation module depending on the control parameter set value.

8. The fuel cell energy supply system according to claim 7, wherein the energy state parameter comprises at least one of an output voltage value, a system set value of output voltage, a set value of output current, a temperature detection value, a power detection value, and a conversion efficiency calculated value of the fuel cell power generation module, a detection value of fuel supply flow or pressure of the fuel cell power generation module, and a health level detection value of the fuel cell power generation module.

9. The fuel cell energy supply system according to claim 7, wherein the compensation factor is a quotient of the energy state parameter of each of the fuel cell power generation modules and an average value of the energy state parameters of the plurality of fuel cell power generation modules.

10. The fuel cell energy supply system according to claim 7, wherein the communication control module is in wired or wireless communication with the plurality of power conversion modules.

11. The fuel cell energy supply system according to claim 7, wherein a range of the compensation factor is limited by at least one of the communication control modules and the power conversion module limits before the power conversion module multiplies the control parameter reference value of each of the power conversion modules by the corresponding compensation factor.

12. The fuel cell energy supply system according to claim 7, wherein the power conversion modules include DC/DC conversion modules.

13. The fuel cell energy supply system according to claim 12, wherein the DC bus is further connected to a power grid through a DC/AC conversion module.

* * * * *